(12) United States Patent
Seo et al.

(10) Patent No.: US 9,538,396 B2
(45) Date of Patent: Jan. 3, 2017

(54) METHOD FOR COMMUNICATION CONSIDERING INTERFERENCE BETWEEN CELLS IN A WIRELESS COMMUNICATION SYSTEM AND DEVICE THEREFOR

(75) Inventors: Inkwon Seo, Anyang-si (KR); Hanbyul Seo, Anyang-si (KR); Kijun Kim, Anyang-si (KR); Hakseong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 54 days.

(21) Appl. No.: 14/005,448

(22) PCT Filed: Mar. 22, 2012

(86) PCT No.: PCT/KR2012/002065
§ 371 (c)(1),
(2), (4) Date: Sep. 16, 2013

(87) PCT Pub. No.: WO2012/128565
PCT Pub. Date: Sep. 27, 2012

(65) Prior Publication Data
US 2014/0003250 A1  Jan. 2, 2014

Related U.S. Application Data

(60) Provisional application No. 61/467,371, filed on Mar. 24, 2011, provisional application No. 61/479,846, filed on Apr. 28, 2011.

(51) Int. Cl.
*H04W 72/06* (2009.01)
*H04W 36/00* (2009.01)
*H04W 24/02* (2009.01)

(52) U.S. Cl.
CPC ......... *H04W 24/02* (2013.01); *H04W 36/0083* (2013.01)

(58) Field of Classification Search
CPC .. H04W 24/10; H04W 36/08; H04W 36/0072; H04W 36/0083
(Continued)

(56) References Cited

U.S. PATENT DOCUMENTS 8,665,813 B2 * 3/2014 Golitschek Edler Von Elbwart ............... H04L 1/0026 370/329
8,903,399 B2 * 12/2014 Centonza ............ H04W 36/245 370/331

(Continued)

FOREIGN PATENT DOCUMENTS

KR   10-2011-0007197 A   1/2011

OTHER PUBLICATIONS

Alcatel-Lucent. "Signalling support for Almost Blank Subframe patterns", 3GPP TSG-RAN WG2 Meeting #72, R2-106449, 15-49 Nov. 2010.
(Continued)

*Primary Examiner* — Mohamed Kamara
*Assistant Examiner* — Will Lin
(74) *Attorney, Agent, or Firm* — Dentons US LLP

(57) ABSTRACT

The present invention relates to a wireless communication system. More particularly, the present invention relates to a method and a device for measuring a channel in a wireless communication system, and comprises a step of, during a handover, receiving information on a specific time interval from a first cell, receiving a signal from a second cell through the specific time interval, and measuring the second cell using the received signal, wherein the first cell and the second cell are different from each other.

6 Claims, 16 Drawing Sheets

(58) Field of Classification Search
USPC .................................... 370/331, 329, 252
See application file for complete search history.

(56) References Cited

U.S. PATENT DOCUMENTS

| | | | |
|---|---|---|---|
| 2008/0176566 A1* | 7/2008 | Akita | H04W 36/32 455/436 |
| 2008/0318578 A1* | 12/2008 | Worrall | H04W 36/02 455/437 |
| 2009/0247150 A1* | 10/2009 | Fischer | H04W 24/10 455/425 |
| 2010/0091734 A1* | 4/2010 | Park | H04W 92/20 370/331 |
| 2010/0208696 A1* | 8/2010 | Lee | H04W 36/0055 370/331 |
| 2010/0216471 A1* | 8/2010 | Meyer | H04W 36/26 455/436 |
| 2012/0088507 A1* | 4/2012 | Legg | H04W 36/245 455/436 |
| 2012/0115527 A1* | 5/2012 | Narasimha | H04W 24/10 455/513 |
| 2012/0122440 A1* | 5/2012 | Krishnamurthy | H04L 5/0053 455/418 |
| 2013/0084865 A1* | 4/2013 | Agrawal | H04W 36/0083 455/436 |

OTHER PUBLICATIONS

Qualcomm. "Email discussion [72#33]: time domain ICIC "Pattern2" details." 3GPP TSG-RAN WG2 meeting #72, R2-110053, Jan. 17-21, 2011.

R2-106245: Qualcomm Incorporated "Way forward for connected mode el CIC" 3GPP TSG-RAN WG2 meeting #72 Jacksonville, US, Nov. 15-19, 2010.

R2-111022: Huawei, HiSilicon "Handling of Resource Restriction Patterns at Handover" 3GPP TSG-RAN WG2 meeting #73 Taipai, Feb. 21-25, 2011.

Ardian Ulvan et al: "Handover scenario and procedure in LTE-based femtocell networks", UBICOMM 2010: The fourth international conference on mobile ubiquitous computing, systems, services and technologies, pp. 213-218, ISBN:, Oct. 30, 2010, XP055173688.

* cited by examiner

* further include subframe allocation information indicating measurement set

METHOD FOR COMMUNICATION CONSIDERING INTERFERENCE BETWEEN CELLS IN A WIRELESS COMMUNICATION SYSTEM AND DEVICE THEREFOR

This application is the U.S. National Phase of International Application Number PCT/KR2012/002065 filed on Mar. 22, 2012, which claims priority to U.S. Provisional Application No. 61/467,371, filed on Mar. 24, 2011 and U.S. Provisional Application No. 61/479,846 filed on Apr. 28, 2011, all of which are incorporated by reference for all purposes as if fully set forth herein.

TECHNICAL FIELD

The present invention relates to a wireless communication system, and more particularly, to a wireless communication system for coordinating inter-cell interference.

BACKGROUND ART

Wireless communication systems have been diversified in order to provide various types of communication services such as voice or data service. In general, a wireless communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and the like.

DISCLOSURE

Technical Problem

An object of the present invention devised to solve the problem lies in a method and device for efficiently performing channel measurement, cell selection and signal transmission/reception in consideration of inter-cell interference in a wireless communication system.

The technical problems solved by the present invention are not limited to the above technical problems and those skilled in the art may understand other technical problems from the following description.

Technical Solution

The object of the present invention can be achieved by providing a method of performing channel measurement at a user equipment (UE) in a wireless communication system, including receiving information about a specific time interval from a first cell during handover, receiving a signal from a second cell through the specific time interval, and measuring the second cell using the received signal In another aspect of the present invention, provided herein is a user equipment (UE) used in a wireless communication system, including a radio frequency (RF) unit and a processor, wherein information about a specific time interval is received from a first cell during handover, a signal is received from a second cell through the specific time interval, and the second cell is measured using the received signal, and wherein the first cell and the second cell are different.

The first cell may be a source cell and the second cell may be a target cell.

The information about the specific time interval may be received from the first cell via a handover command message.

The signal of the second cell may be received using the information about the specific time interval in the handover command message until receiving updated information about the specific time interval.

The updated information may be received via system information or signaling dedicated to the UE.

Advantageous Effects

According to the present invention, it is possible to efficiently perform channel measurement, cell selection and signal transmission/reception in consideration of inter-cell interference in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

The following embodiments of the present invention may be utilized in various radio access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system or a Single Carrier Frequency Division Multiple Access (SC-FDMA) system. CDMA may be implemented as radio technology such as Universal Terrestrial Radio Access (UTRA) or CDMA2000. TDMA may be implemented as radio technology such as Global System for Mobile communications (GSM)/General Packet Radio Service (GPRS)/Enhanced Data Rates for GSM Evolution (EDGE). OFDMA may be implemented as radio technology such as IEEE 802.11 (Wi-Fi), IEEE 802.16 (WiMAX), IEEE 802-20 or E-UTRA (Evolved UTRA). UTRA is part of the Universal Mobile Telecommunications System (UMTS). UMTS is an European based wideband code division multiple access (WCDMA), a GSM, and a $3^{rd}$ Generation (3G) asynchronous mobile communication system operating in a GPRS. A $3^{rd}$ Generation Partnership Project Long Term Evolution (3GPP LTE) communication system is part of the E-UMTS (Evolved UMTS) which employs the E-UTRA, which employs OFDMA in downlink, and employs SC-FDMA in uplink. The LTE-Advanced (LTE-A) is an evolved version of the 3GPP LTE.

For clarity, the following description focuses on the 3GPP LTE/LTE-A. However, technical features of the present invention are not limited thereto. It should be noted that specific terms disclosed in the present invention are proposed for the convenience of description and better understanding of the present invention, and the use of these specific terms may be changed to another format within the technical scope or spirit of the present invention.

Figure 1:
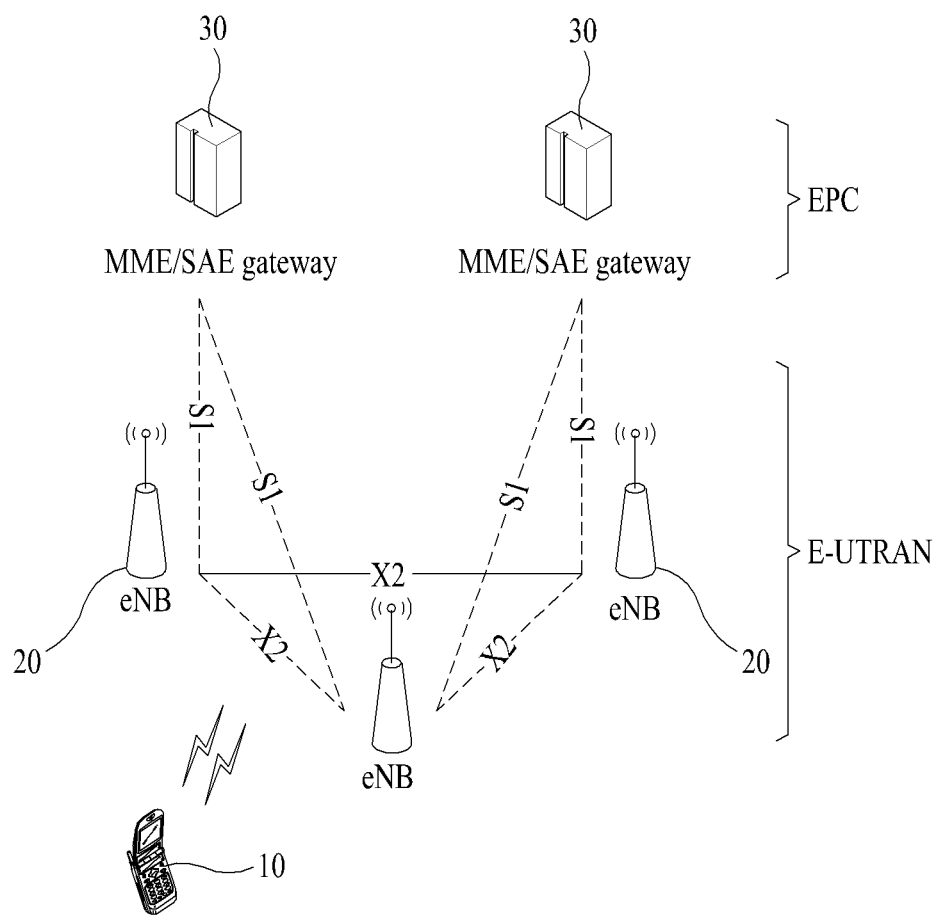
FIG. 1 is a diagram showing a network structure of an Evolved Universal Mobile Telecommunications System (E-UMTS)

FIG. 1 is a diagram showing a network structure of an E-UMTS. The E-UMTS is also referred to as a Long Term Evolution (LTE) system. Communication networks are widely distributed to provide various communication services such as voice and packet data services.

Referring to FIG. 1, the E-UMTS network mainly includes an Evolved UMTS Terrestrial Radio Access Network (E-UTRAN), an Evolved Packet Core (EPC) and one or more User Equipments (UEs). The E-UTRAN includes one or more base stations (eNBs) 20 and a plurality of UEs 10 may be located per cell. One or more E-UTRAN mobility management entity/system architecture evolution (MME/SAE) gateway 30 may be located at the end of the network to be connected to an external network.

In the present specification, "downlink" refers to communication from the eNB 20 to the UE 10 and "uplink" refers to communication from the UE to the eNB. The UE 10 is a portable communication device of a user and may be also referred to as a mobile station (MS), a user terminal (UT), a subscriber station (SS) or a wireless device.

The eNB 20 provides the UE 10 with an end point of a user plane and a control plane. The MME/SAE gateway 30 provides the UE 10 with an end point of a session and mobility management function. The eNB 20 and the MME/SAE gateway 30 may be connected via an S1 interface.

The eNB 20 is generally a fixed station communicating with the UE 10 and may also be referred to as a base station (BS) or an access point. One eNB 20 may be located per cell. An interface for transmitting user traffic or control traffic may be used between eNBs 20.

The MME performs various functions such as NAS signaling to the eNB 20, NAS signaling security, AS security control, inter CN node signaling for mobility between 3GPP access networks, idle mode UE reachability (including control and execution of paging retransmission), tracking area list management (for a UE in an idle mode and an active mode), PDN GW and serving GW selection, MME selection for handover accompanied with MME change, SGSN selection for handover to a 2G or 3G 3GPP access network, bearer management including roaming, authentication and dedicated bearer configuration, and PWS (including ETWS and CMAS) message transmission support. An SAE gateway host provides various functions such as per-user based packet filtering (e.g., using deep packet inspection), lawful interception, UE IP address allocation, transport port level packet marking in downlink, UL and DL service level charging, gating and rate reinforcement, DL rate reinforcement based on APN-AMBR.

The MME/SAE gateway 30 is simply referred to as a "gateway" in the present specification, for clarity. The MME/SAE gateway 30 includes both an MME gateway and an SAE gateway.

A plurality of nodes may be connected between the eNB 20 and the gateway 30 via an S1 interface. The eNBs 20 may be connected to each other via an X2 interface and neighbor eNBs may have a mesh network structure having an X2 interface.

Figure 2A:
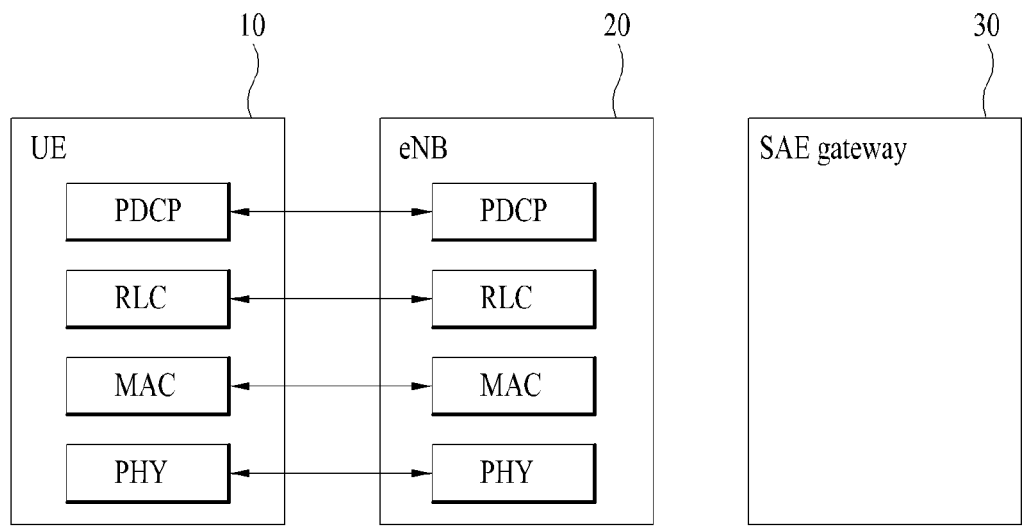
FIGS. 2a to 2b are diagrams showing a user-plane protocol and a control-plane protocol for an E-UTMS.
Figure 2B:
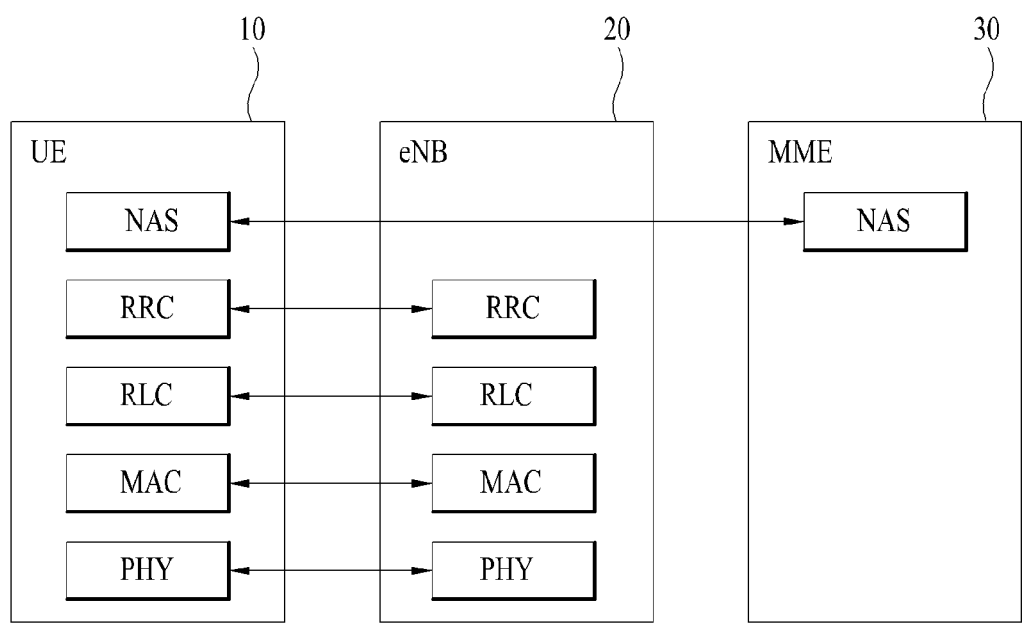

FIGS. 2a to 2b are diagrams showing a user-plane protocol and a control-plane protocol for an E-UTMS. As shown in FIGS. 2a and 2b, protocol layers may be divided into a first layer L1, a second layer L2 and a third layer L3 based on the three low-level layers of the Open Systems Interconnection (OSI) model of a communication system.

A physical layer, that is, the first layer L1, provides an information transport service to a higher layer using a physical channel. The physical layer is connected to a medium access control (MAC) layer located on a higher layer via a transport channel. Data is transported between the MAC layer and the physical layer via the transport channel. Data is also transported between different physical layers, such as a physical layer of a transmitting side and a physical layer of a receiving side, via a physical channel.

The MAC layer of the second layer L2 provides a service to a radio link control (RLC) layer of a higher layer via a logical channel. The RLC layer of the second layer L2 supports reliable data transmission. Although the RLC layer is shown in FIGS. 2a and 2b, it is noted that the RLC layer is not required if the MAC layer performs an RLC function.

A packet data convergence protocol (PDCP) layer of the second layer performs a header compression function to reduce unnecessary control information, for efficient transmission of an Internet Protocol (IP) packet such as an IPv4 packet or an IPv6 packet in a radio interface having a relatively small bandwidth.

A radio resource control (RRC) layer located at the bottom of a third layer L3 is defined only in the control plane and is responsible for control of logical, transport, and physical channels in association with configuration, re-configuration, and release of radio bearers (RBs). The RB is a service that the second layer L2 provides for data communication between the UE 10 and the E-UTRAN.

As shown in FIG. 2a, the RLC and MAC layers are terminated at the eNB 20 on the network side and may perform functions such as scheduling, automatic repeat request (ARQ) and hybrid automatic repeat request (HARQ). The PDCP layer is terminated at the eNB 20 on the network side and may perform user plane functions such as header compression, integrity protection and encryption.

As shown in FIG. 2b, the RLC and MAC layers are terminated at the eNB 20 on the network side and perform the same functions as the control plane. As shown in FIG. 2b, the RRC layer is terminated at the eNB 20 on the network side and may perform functions such as broadcasting, paging, RRC connection management, radio bearer (RB) control, mobility functions and UE 10 measurement report and control. As shown in FIG. 2b, the NAS control protocol is terminated at the MME of the gateway 30 on the network side and may perform functions such as SAE bearer management, authentication, LTE_IDLE mobility handling, LTE-IDLE paging origination and security control for signaling between the gateway and the UE 10.

The RRC state may be divided into two different states, namely, RRC_IDLE and RRC_CONNECTED.

In the RRC_IDLE state, the UE 10 may receive a broadcast of system information and paging information during discontinuous reception (DRX) configured by non-access stratum (NAS). The UE may be allocated an ID for uniquely identifying the UE in a tracking region, and perform public land mobile network (PLMN) selection and cell re-selection. In addition, in the RRC_IDLE state, no RRC context is stored in the eNB.

In the RRC_CONNECTED state, the UE has context in the E-UTRAN and E-UTRAN RRC connection and thus transmits and/or receives data to/from the eNB using the context. The UE 10 may report channel quality information and feedback information to the eNB.

In the RRC_CONNECTED state, the E-UTRAN recognizes a cell to which the UE 10 belongs. Accordingly, the network may transmit and/or receive data to/from the UE 10, control UE mobility (e.g., handover, inter-radio access technology (RAT) cell change order to a GSM EDGE radio access network (GERAN) having network assisted cell change (NACC)), and perform cell measurement of peripheral cells.

In the RRC_IDLE mode, the UE 10 specifies a paging DRX cycle. More specifically, the UE 10 monitors a paging signal in a specific paging occasion per UE-specific paging DRX cycle.

In a wireless communication system, a UE receives information from an eNB in downlink (DL) and transmits information to an eNB in uplink (UL). Information transmitted and received between an eNB and a UE includes data and a variety of control information and various physical channels exist according to the kind/usage of information transmitted or received by the UE.

Figure 3:
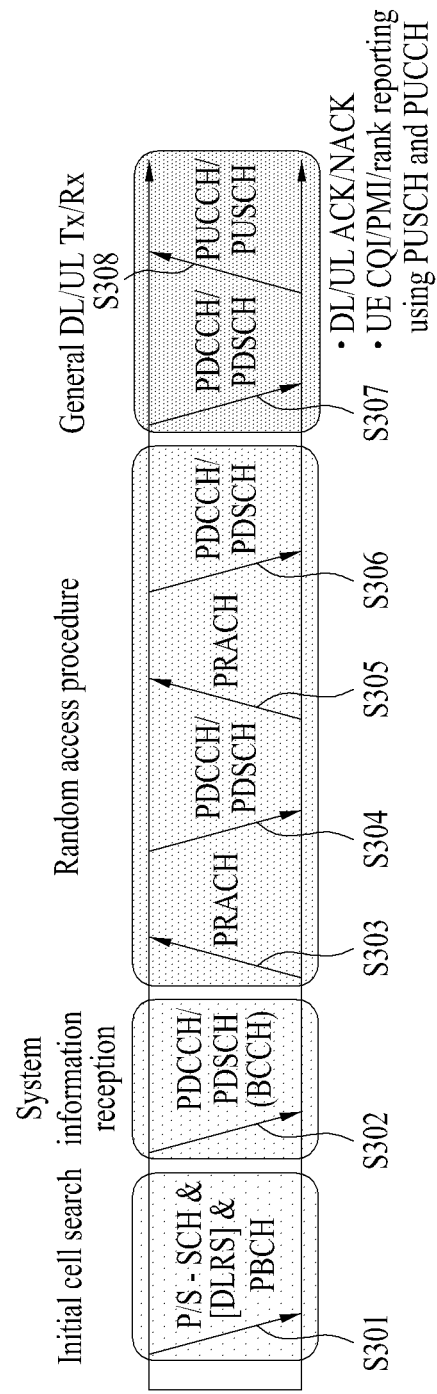
FIG. 3 is a diagram showing physical channels used in a $3^{rd}$ Generation Partnership Project (3GPP) system as an example of a wireless communication system and a general signal transmission method using the same.

FIG. 3 is a diagram showing physical channels used in a 3$^{rd}$ Generation Partnership Project (3GPP) Long Term Evolution (LTE) system and a general signal transmission method using the same.

Referring to FIG. 3, a UE performs an initial cell search operation such as synchronization with an eNB in step S301, when power is turned on or the UE enters a new cell. The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel (PBCH) from the eNB so as to acquire broadcast information within the cell (e.g., a master information block (MIB)). Meanwhile, the UE may receive a Downlink Reference Signal (DL RS) so as to confirm a downlink channel state in the initial cell search step.

The UE which has completed the initial cell search may receive a Physical Downlink Control Channel (PDCCH) and a Physical Downlink Shared Channel (PDSCH) according to information about the PDCCH so as to acquire more detailed system information, in step S302.

Thereafter, the UE may perform a Random Access Procedure (RACH) in steps S303 to S306, for connection to the eNB. In this case, the UE may transmit a preamble through a Physical Random Access Channel (PRACH) (S303), and receive a response message to the preamble through the PDCCH and the PDSCH corresponding thereto (S304). In contention-based random access, a contention resolution procedure including transmission of an additional PRACH (S305) and reception of the PDCCH and the PDSCH corresponding thereto (S306) may be performed.

The UE which has performed the above procedures may perform PDCCH/PDSCH reception (S307) and Physical Uplink Shared Channel PUSCH)/Physical Uplink Control Channel (PUCCH) transmission (S308) as a general uplink/downlink signal transmission procedure. Control information transmitted from the UE to the eNB is collectively referred to as uplink control information (UCI). UCI includes hybrid automatic repeat and request acknowledgement (ACK)/negative-ACK (NACK), scheduling request (SR), channel state information (CSI), etc. The CSI includes a channel quality indicator (CQI), a precoding matrix index (PMI), a rank indicator (RI), etc. The UCI may be generally transmitted via a PUCCH. However, if control information and traffic data are simultaneously transmitted, the UCI may be transmitted via a PUSCH. In addition, the UCI may be aperiodically transmitted via a PUSCH according to a network request/instruction.

Figure 4:
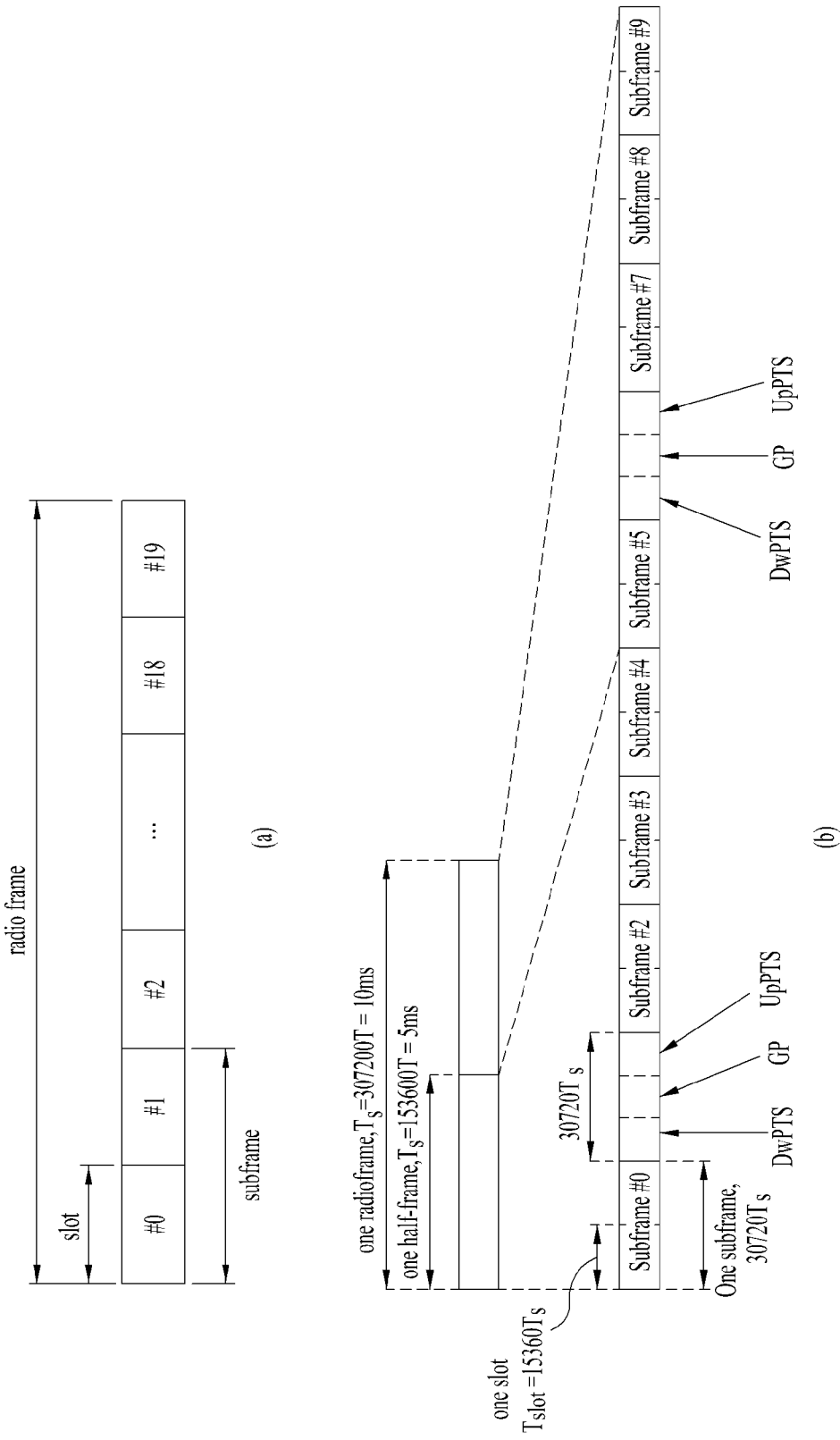
FIG. 4 is a diagram showing the structure of a radio frame.

FIG. 4 is a diagram showing the structure of a radio frame. In a cellular OFDM radio packet communication system, uplink/downlink data packet transmission is performed in subframe units and one subframe is defined as a predetermined time interval including a plurality of OFDM symbols. The 3GPP LTE standard supports a type 1 radio frame structure applicable to frequency division duplex (FDD) and a type 2 radio frame structure applicable to time division duplex (TDD).

FIG. 4(a) shows the structure of type 1 radio frame. A downlink radio frame includes 10 subframes and one subframe includes two slots in a time domain. A time required to transmit one subframe is referred to as a transmission time interval (TTI). For example, the length of one subframe may be 1 ms and the length of one slot may be 0.5 ms. One slot includes a plurality of OFDM symbols in a time domain and includes a plurality of resource blocks (RBs) in a frequency domain. In a 3GPP LTE system, since OFDM is used in downlink, an OFDM symbol indicates one symbol interval. The OFDM symbol may be referred to as an SC-FDMA symbol or symbol interval. A resource block (RB) as a resource allocation unit may include a plurality of consecutive subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the normal CP. In case of the extended CP, for example, the number of OFDM symbols included in one slot may be six. If a channel state is unstable, for example, if a user equipment (UE) moves at a high speed, the extended CP may be used in order to further reduce inter-symbol interference.

In case of using the normal CP, since one slot includes seven OFDM symbols, one subframe includes 14 OFDM symbols. At this time, the first at most three OFDM symbols of each subframe may be allocated to a Physical Downlink Control Channel (PDCCH) and the remaining OFDM symbols may be allocated to a Physical Downlink Shared Channel (PDSCH).

FIG. 4(b) is a diagram showing the structure of the type 2 radio frame. The type 2 radio frame includes two half frames. Each half frame includes five subframes, a downlink pilot time slot (DwPTS), a guard period (GP), and an uplink pilot time slot (UpPTS). One subframe includes two slots. The DwPTS is used for initial cell search, synchronization and channel estimation at a UE. The UpPTS is used for channel estimation at an eNB and uplink transmission synchronization of a UE. The guard period is used to remove interference occurring in uplink due to multi-path delay of a downlink signal between uplink and downlink.

The structure of the radio frame is only exemplary. Accordingly, the number of subframes included in the radio frame, the number of slots included in the subframe or the number of symbols included in the slot may be changed in various manners.

Figure 5:
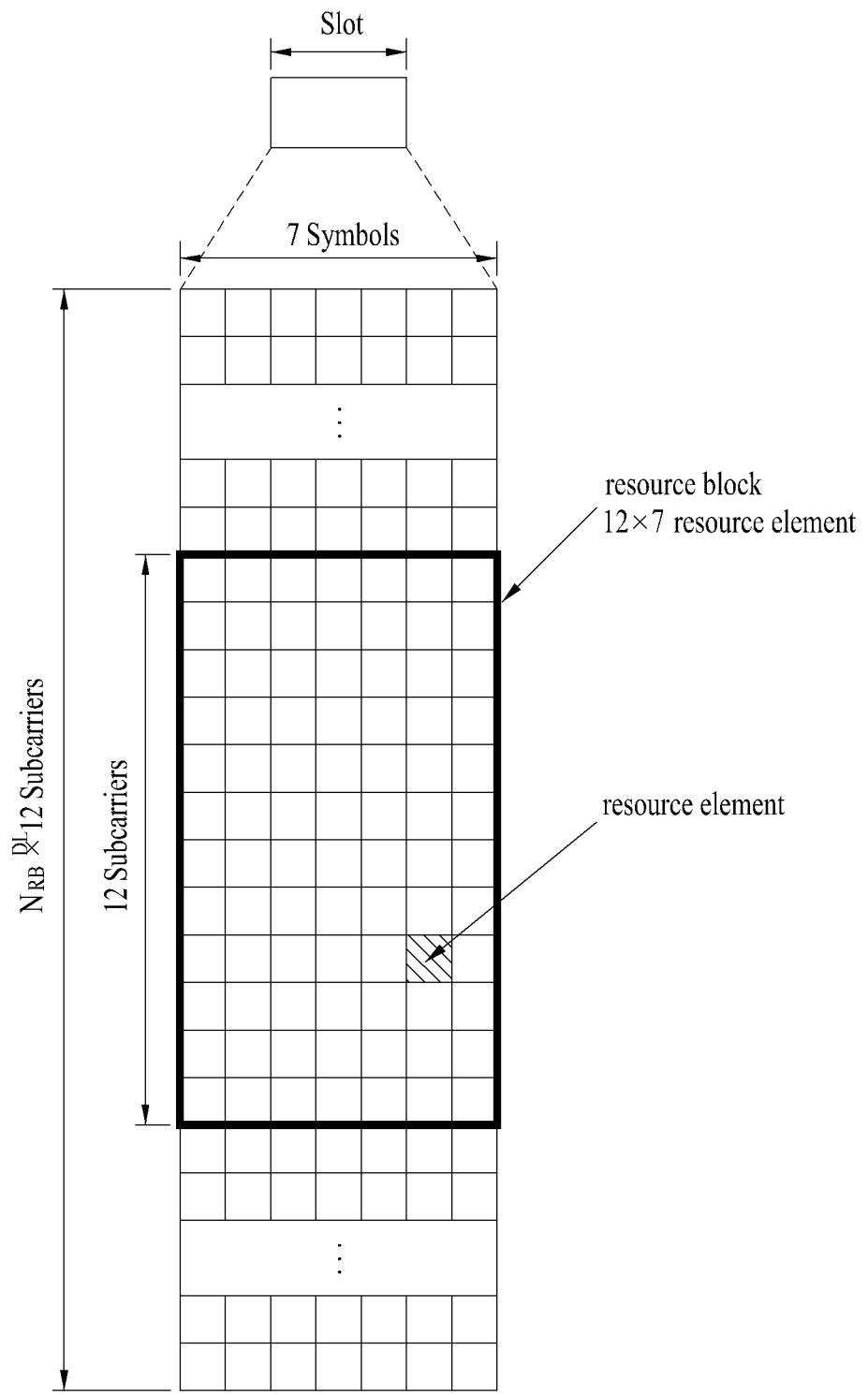
FIG. 5 is a diagram showing a resource grid of a downlink slot.

FIG. 5 is a diagram showing a resource grid of a downlink slot.

Referring to FIG. 5, a downlink slot includes a plurality of OFDM symbols in a time domain. One downlink slot may include seven (six) OFDM symbols and one RB may include 12 subcarriers in a frequency domain. Each element on the resource grid is referred to as a resource element (RE). One RB includes 12×7(6) REs. The number $N_{RB}$ of RBs included in a downlink slot depends on a downlink transmission bandwidth. The structure of the uplink slot may be equal to the structure of the downlink slot, except that an OFDM symbol is replaced with an SC-FDMA symbol.

Figure 6:
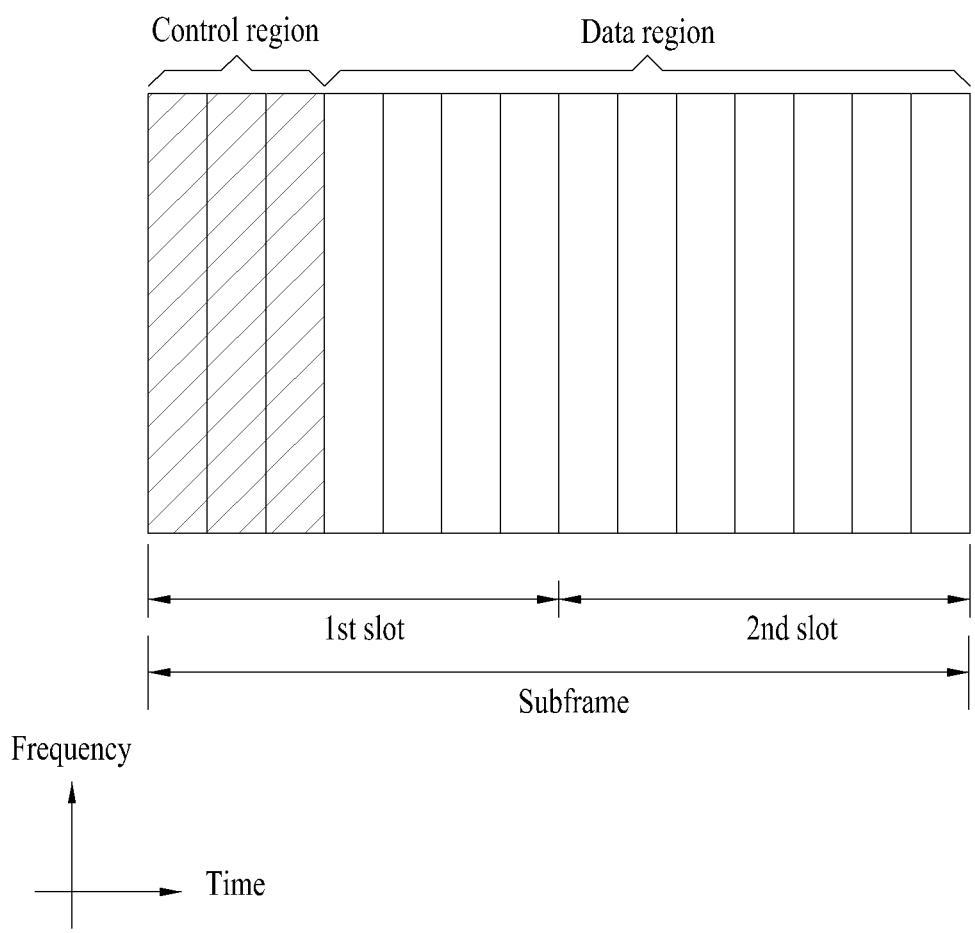
FIG. 6 is a diagram showing the structure of a downlink frame.

FIG. 6 is a diagram showing the structure of a downlink subframe.

Referring to FIG. 6, a maximum of three (four) OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in LTE include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and carries information about the number of OFDM symbols used to transmit the control channel within the subframe. The PHICH carries a HARQ ACK/NACK signal in response to uplink transmission.

The control information transmitted through the PDCCH is referred to as Downlink Control Information (DCI). The DCI includes resource allocation information and other control information for a UE or a UE group. For example, the DCI includes uplink or downlink scheduling information, an uplink transmit (Tx) power control command, etc.

The PDCCH may carry transmission format and resource allocation information of a Downlink Shared Channel (DL-SCH), transmission format and resource allocation information of an Uplink Shared Channel (UL-SCH), paging information on a Paging Channel (PCH), system information on the DL-SCH, resource allocation of a higher layer control message such as a Random Access Response (RAR) transmitted on the PDSCH, a set of transmit (Tx) power control commands for individual UEs within a UE group, a Tx power control command, information indicating activation of Voice over IP (VoIP), etc. A plurality of PDCCHs may be transmitted within the control region. The UE may monitor the plurality of PDCCHs. The PDCCHs are transmitted as an aggregate of one or several consecutive control channel elements (CCEs). The CCE is a logical allocation unit used to provide the PDCCHs with a coding rate based on the state of a radio channel. The CCE corresponds to a plurality of resource element groups (REGs). The format of the PDCCH and the number of PDCCH bits are determined based on the number of CCEs. The eNB determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information RNTI (SI-RNTI) may be masked to the CRC. If the PDCCH is for random access response, a random access-RNTI (RA-RNTI) may be masked to the CRC.

Figure 7:
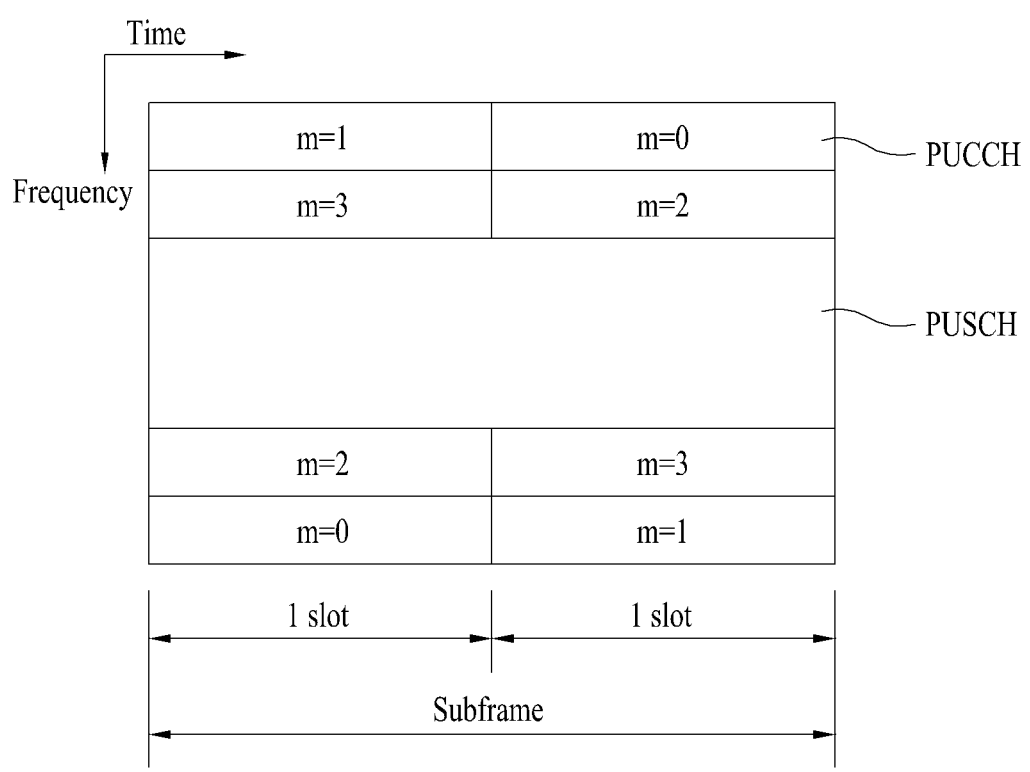
FIG. 7 is a diagram showing the structure of an uplink subframe.

FIG. 7 is a diagram showing the structure of an uplink subframe used in LTE.

Referring to FIG. 7, the uplink subframe includes a plurality (e.g., 2) of slots. The slot may include SC-FDMA symbols, the number of which is changed according to CP length. The uplink subframe may be divided into a control region and a data region in a frequency domain. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The PUCCH may be used to transmit the following control information.
  Scheduling request (SR): Information used to request uplink (UL)-SCH resources. This is transmitted using an on-off keying (OOK) method.
  HARQ ACK/NACK: Response signal to downlink data packets on a PDSCH. This indicates whether downlink data packets are successfully received. 1-bit ACK/NACK is transmitted in response to a single downlink codeword and 2-bit ACK/NACK is transmitted in response to two downlink codewords.
  Channel quality indicator (CQI): Feedback information for a downlink channel. Multiple input multiple output (MIMO)-related feedback information includes a rank indicator (RI) and a precoding matrix indicator (PMI). 20 bits are used per subframe.

The amount of control information (UCI) transmittable by a UE in a subframe depends on the number of SC-FDMA symbols available in control information transmission. The SC-FDMA symbols available in control information transmission mean SC-FDMA symbols excluding SC-FDMA symbols for reference signal transmission in a subframe, and a last SC-FDMA symbol of the subframe is also excluded in case of a subframe in which a sounding reference signal (SRS) is set. A reference signal is used for coherent detection of a PUCCH. The PUCCH supports 7 formats according to transmitted information.

Figure 8:
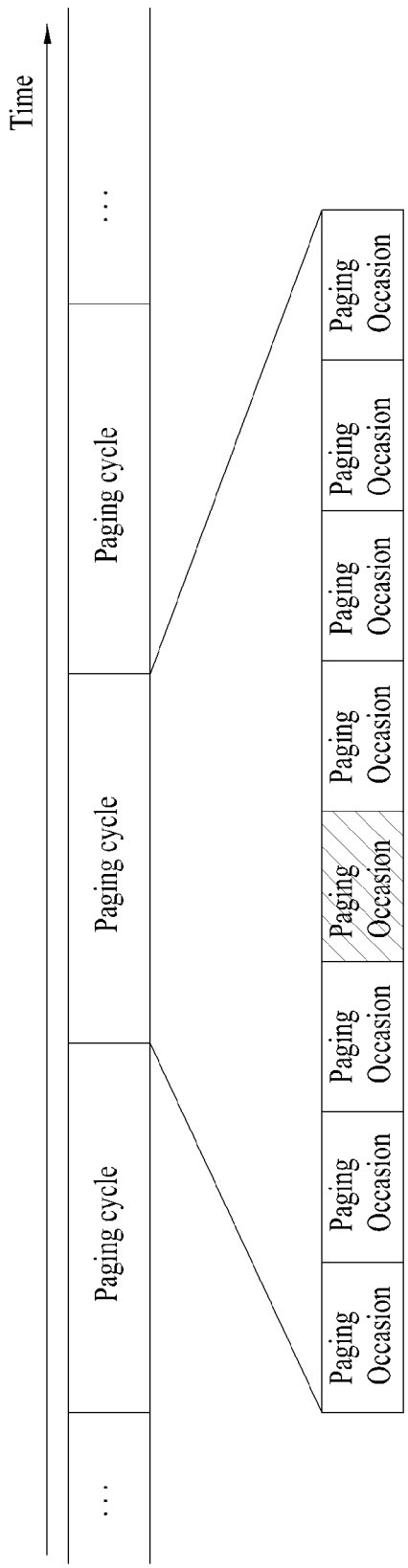
FIG. 8 is a diagram showing an example of paging channel transmission.

FIG. 8 shows an example of paging channel transmission used for an E-UMTS. When a paging message is received, a UE may perform discontinuous reception (DRX) for the purpose of reducing power consumption. A network may configure a plurality of paging occasions per time cycle which is referred to as a paging DRX cycle and a specific UE may perceive a specific paging occasion and acquire a paging message. More specifically, the UE awakes at a paging occasion and receives a PDCCH. When a paging-RNTI P-RNTI) corresponding to paging is received via the PDCCH, the UE receives an actual paging message via radio resources indicated by the PDCCH. The UE confirms whether an ID (e.g., an international mobile subscriber identity (IMSI)) thereof is present in the paging message and informs a higher layer that the paging has arrived if the ID is present.

Figure 9:
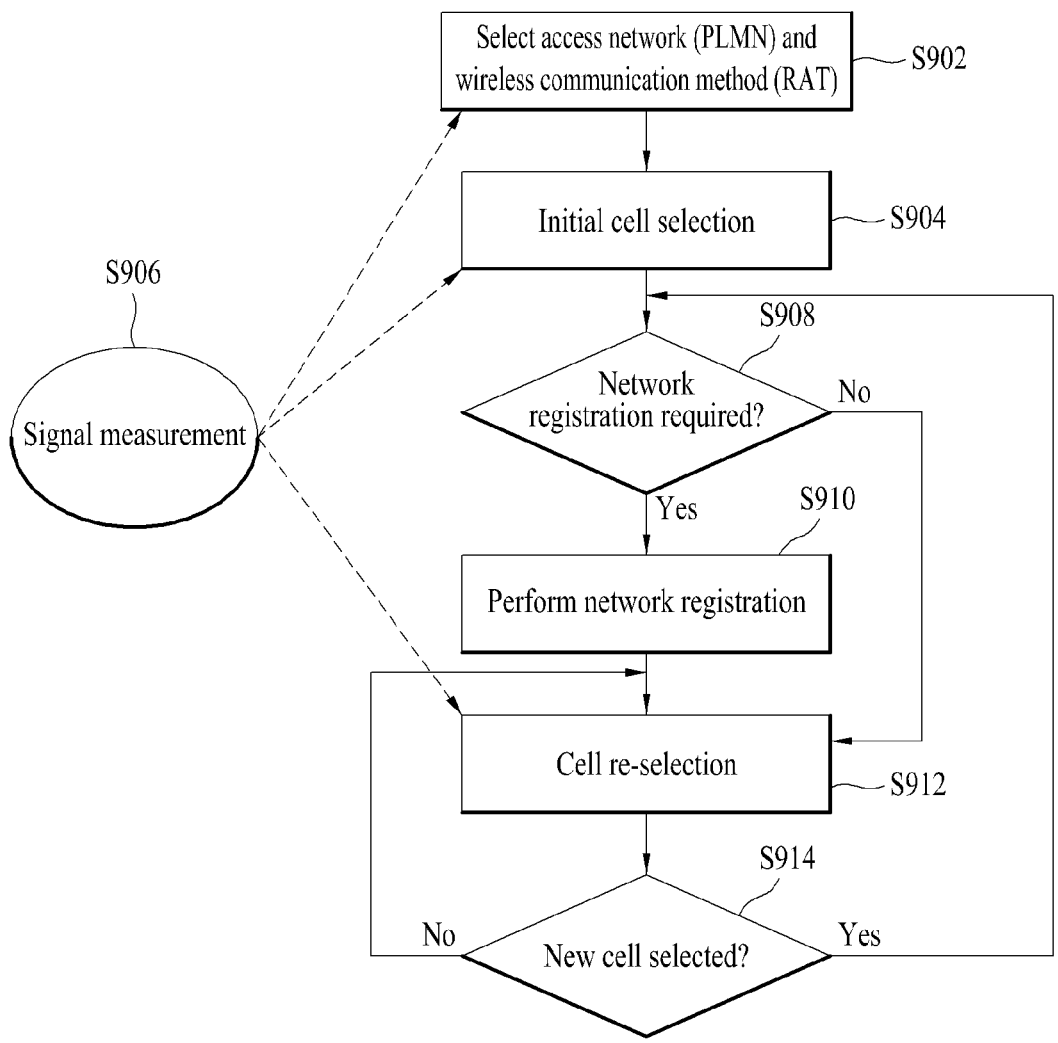
FIG. 9 is a diagram showing a cell selection/reselection process.

FIG. 9 is a diagram showing a cell selection/reselection process. The cell is selected for the purpose of registering a UE with a network to receive a service from an eNB. The UE should receive all system information before accessing the eNB and always have newest system information. The UE selects a cell in order to receive system information in an idle mode (e.g., an RRC_IDLE state), when power is first turned on. If strength or quality of a signal between the UE and the eNB is deteriorated due to mobility of the UE, the UE reselects another cell for the purpose of maintaining data transmission quality.

Referring to FIG. 9, when power is turned on, the UE automatically or manually selects a public land mobile network (PLMN), from which the UE receives a service, and a radio access technology (RAT) for communication (S902). The PLMN and RAT information may be selected by the user of the UE or may be stored in a universal subscriber identity module (USIM) in advance. Thereafter, the UE measures a signal from the eNB in all searchable frequency bands (S906) and performs an initial cell selection process of selecting a cell having a largest value among cells having the measured signal strength or quality greater than a reference value (S904). The reference value is defined in a system in order to guarantee the quality of a physical signal in data transmission and reception.

If a serving cell is determined by a cell selection process, the UE receives system information (SI) periodically transmitted from the serving cell. The system information includes fundamental and essential information for enabling the UE to access the network. In addition, the system information may include information about neighbor cells (neighbor cell list (NCL)) located adjacent to the serving cell. Thereafter, the UE waits in the idle mode (e.g., an RRC_IDLE state) in order to request a service from the network (e.g., originating call) or receive a service from the network (e.g., terminating call).

Thereafter, the UE performs a network registration process (S910). The network registration process includes registering the ID (IMSI) of the UE in order to receive a service (e.g., page) from the network. The UE in the idle mode may receive control information such as system information from the cell but is not in the RRC_CONNECTED state with the UTRAN. Accordingly, since the network cannot know information about the UE, the IMSI used on non-access stratum (NAS) is used. Whenever the UE selects the cell, the UE does not register with the network. If network information included in the system information (e.g., tracking area identity (TAI)) is different from the network information that the UE knows, the UE registers with the network.

The UE selects one of other peripheral cells for providing a signal property better than that of a cell of an eNB, to which the UE is connected (S912), if the signal strength or quality of the serving cell is lower than that of a neighbor cell. This process is referred to as cell re-selection to be distinguished from initial cell selection of S904. The UE in the idle mode repeats a process of re-selecting a cell having a better signal property through signal measurement of a cell, from which a service is received, and a neighbor cell.

Figure 10:
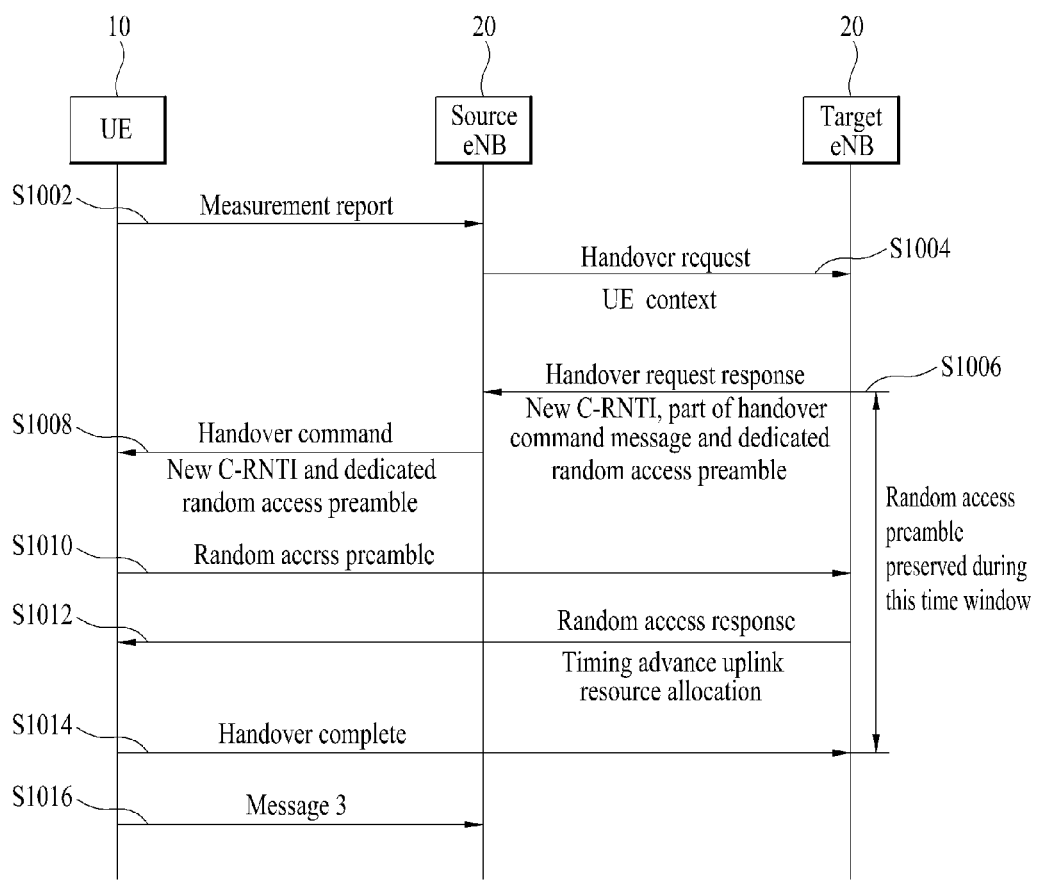
FIG. 10 is a diagram showing a handover process.

FIG. 10 is a diagram showing a conventional handover process. A UE 10 transmits a measurement report to a source eNB 20 (S602). The source eNB 20 transmits UE 10 context information and a handover request message to a target eNB (S1004).

The target eNB 20 transmits a handover request response to the source eNB (S1006). The handover request response includes information related to random access, such as a new C-RNTI, a part of a handover command message and a dedicated random access signature for contention-free random access in a target cell.

The source eNB 20 transmits a handover command to the UE (S1008). The handover command includes information related to random access such as a new C-RNTI and a dedicated signature to be used by the UE 10. The handover command may be indicated transmission of an RRC connection reconfiguration message having mobility control information (MCI).

After a handover command has been received, the UE 10 performs a random access procedure with the target eNB in order to acquire a timing advance (TA) value. In the handover process, the random access procedure is a contention-free method in which a signature is reserved for the UE 10 in order to avoid collision. More specifically, the UE 10 transmits a random access preamble using a dedicated random access signature to begin the random access procedure for the target eNB 20 (S1010). The target eNB 20 transmits a random access response message to the UE 10 (S1012). The random access response message includes TA and uplink resource allocation. The UE 10 transmits a handover complete message to the target eNB 20 (S1014).

Figure 11:
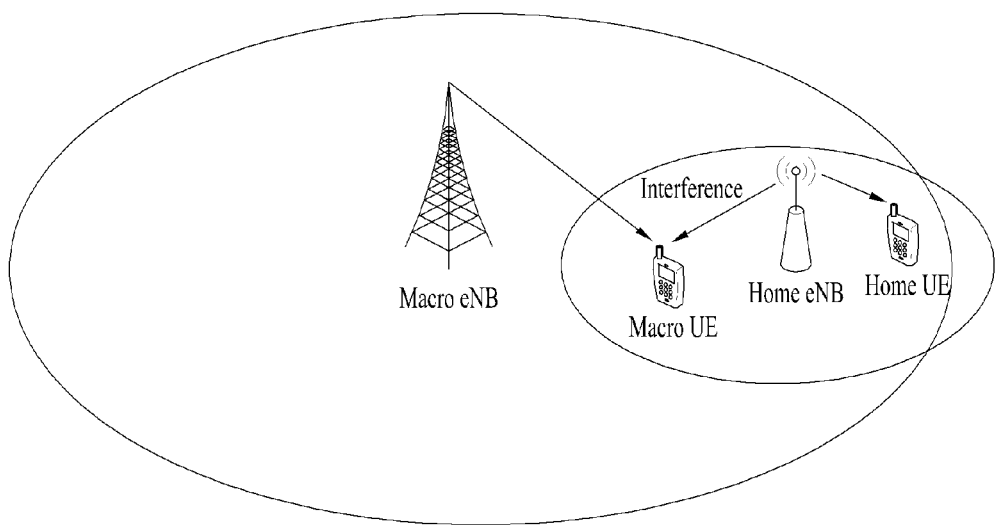
FIG. 11 is a diagram showing a heterogeneous network (HetNet) having a macro cell and a micro cell.

FIG. 11 is a diagram showing a heterogeneous network (HetNet) having a macro cell and a micro cell. In next-generation communication standards including LTE-A, a heterogeneous network in which a micro cell having low transmit power overlaps with existing macro cell coverage is being discussed.

Referring to FIG. 11, the macro cell may overlap with one or more micro cells. A service of the macro cell is provided by a macro eNB (macro eNode B or MeNB). In the present specification, macro cell and macro eNB may be used interchangeably. A UE connected to the macro cell may be referred to as a macro UE (MUE). The macro UE receives a signal from the macro eNB and transmits a signal to the macro eNB.

The micro cell is also referred to as a femto cell or a pico cell. A service of the micro cell is provided by a pico eNodeB, a femto eNodeB, home eNodeB (HeNB), a relay node (RN), etc. For convenience, the case in which a home eNodB is present in the macro cell is shown in the figure. In the present specification, micro eNodeB, micro cell, pico eNodeB, pico cell, femto eNodeB, femto cell, home eNodeB, home cell, RN and relay cell are used interchangeably, unless stated otherwise. The UE connected to the micro cell may be referred to as a micro UE, a pico UE (PUE), a femto UE (FUE), a home UE (HUE), etc. The micro UE receives a signal from the micro eNodeB (e.g., the femto eNodeB or the pico eNodeB) and transmits a signal to the micro eNodeB.

In the heterogeneous network, since the macro cell and the micro cell overlap each other, inter-cell interference becomes severe. As shown in FIG. 11, if the macro UE is at a boundary between the macro cell and the micro cell, a downlink signal of the home eNodeB causes interference with respect to the macro UE. Similarly, a downlink signal of the macro eNB may cause interference with respect to the home UE within the micro cell. In addition, an uplink signal of the macro UE may cause interference with respect to the home eNodeB. Similarly, an uplink signal of the home UE may cause interference with respect to the macro eNodeB.

In the heterogeneous network of the macro cell and the micro cell, the macro cell may cause strong interference with respect to the UE of the micro cell and, more particularly, the micro UE located at the boundary of the micro cell. Accordingly, a method of cancelling uplink and downlink interference for a data and L1/L2 control signal, a synchronization signal and a reference signal is required. An inter-cell interference cancellation (ICIC) method may be performed in a time, frequency and/or space domain.

Figure 12:
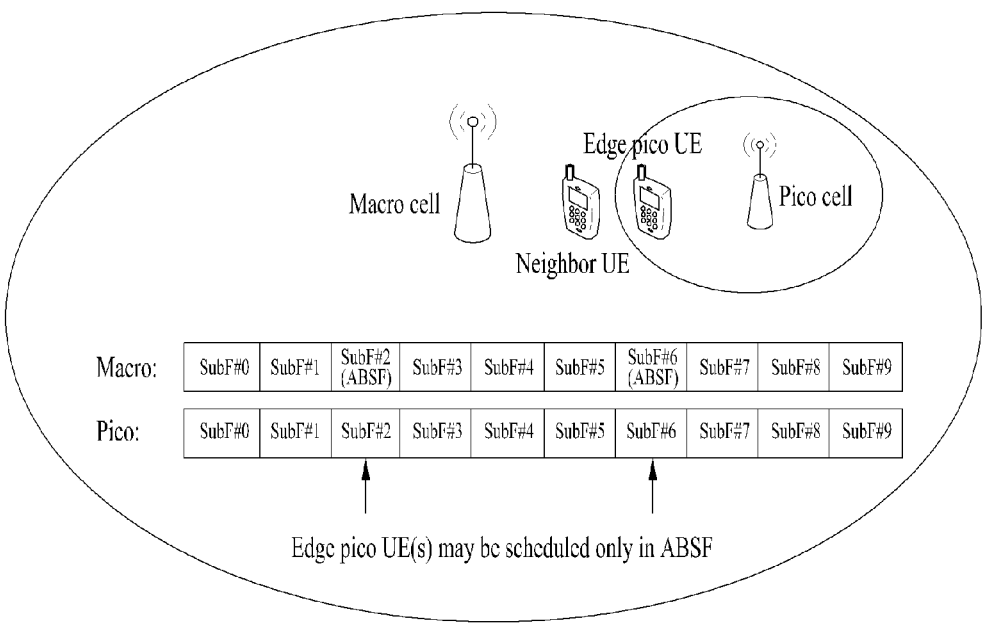
FIGS. 12 to 13 are diagrams showing a method of cancelling inter-cell interference in a heterogeneous network.
Figure 13:
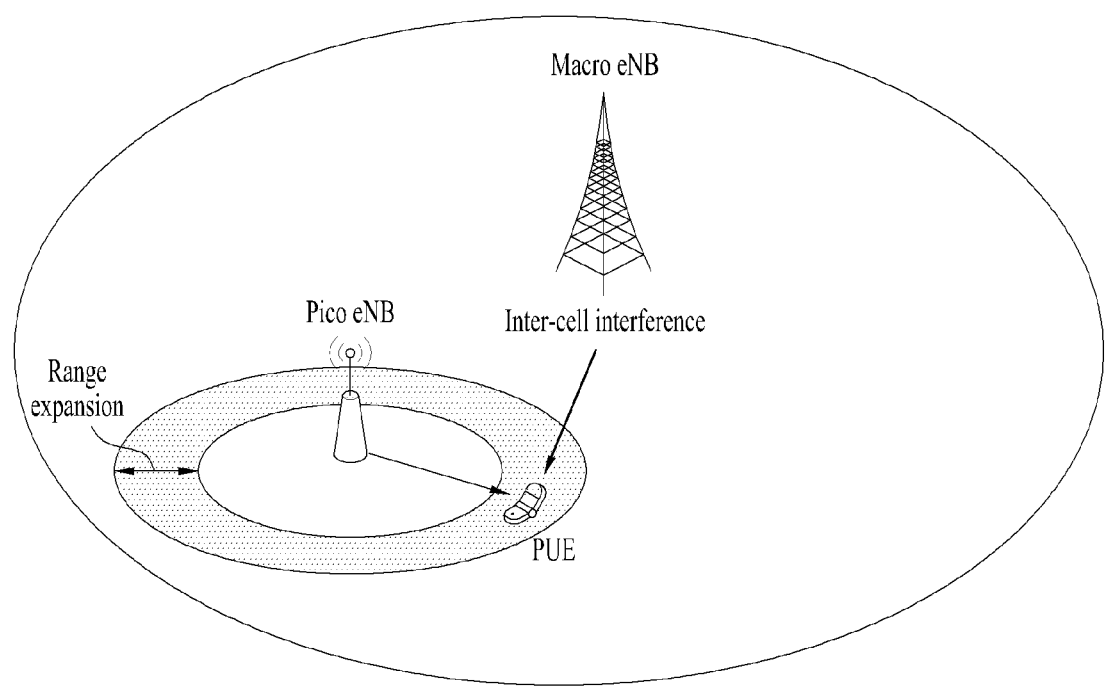

FIGS. 12 to 13 are diagrams showing a method of cancelling inter-cell interference in a heterogeneous network. For convenience, assume that an object to be protected from inter-cell interference is a pico UE. In this case, an aggressor which causes interference is a macro cell (or a macro eNB). In this example, an aggressor cell uses a time domain interference cancellation method. This example is applicable to inter-cell interference cancellation in a macro-femto scenario and a macro-macro scenario as well as a macro-pico scenario.

Referring to FIG. 12, the macro cell which causes inter-cell interference may allocate an almost blank subframe (ABS) (or ABSF) within a radio frame. The ABS indicates a subframe SubF in which a normal DL signal except for a specific DL signal is not transmitted (or DL signal transmission/power is restricted or DL interference is restricted). The ABS may be repeated with a predetermined pattern within one or more radio frames (e.g., four radio frames). This example shows the case in which the ABS is set in subframe #2/#6. Although not limited thereto, the macro cell may inform the micro cell of an ABS configuration (e.g., an ABS allocation pattern) via backhaul and the micro cell may schedule the micro UE using the ABS configuration. For example, the micro UE may be scheduled only during the ABS interval. In addition, channel state information (CSI) measurement of the micro UE may be performed only in the ABS. The ABS allocation pattern may be indicated using a bitmap. In this case, each bit indicates whether a subframe is an ABS. Along with the ABS configuration, a cell list to which the ABS is applied may be signaled.

FIG. 13 shows cell range expansion (CRE). CRE means a method of virtually expanding coverage of a specific cell. By virtually expanding the coverage of the specific cell, an eNB of a specific cell is preferred upon cell (re)selection or handover. CRE may be implemented in various manners. For example, if a UE measures a signal of an interfered cell (e.g, a pico cell), a significant numbers of signals of an interfering cell is removed and the coverage of the interfered cell is expanded (see FIG. 12). In addition, the UE may add a bias to a measurement value of a specific cell (e.g., a pico cell) upon measurement of a signal of each cell to expand the coverage of a specific cell.

Embodiment 1

Target Cell Measurement Method Upon Handover

In the present embodiment, a method of performing measurement with respect to a target cell upon handover is proposed. Here, assume that the target cell participates in inter-cell interference coordination (see FIGS. 12 and 13). For example, inter-cell interference coordination includes ABS-based interference coordination. Hereinafter, assume that the target cell experiences strong interference from a neighbor cell (including a serving cell). Accordingly, the neighbor cell may set some subframes as an ABS for operation of the target cell and the target cell may perform scheduling in the subframes in a state in which interference from the neighbor cell is reduced.

Upon measurement of a cell which participates in ABS-based interference coordination, the strength or quality of a signal of the cell (e.g., signal-to-interference plus noise ratio (SINR)) significantly differs between an ABS and a non-ABS. Accordingly, in order to enable a report of a predictable measurement value, an eNB should restrict a subframe set, which is subjected to downlink measurement, to a subframe set which experiences a uniform interference level. The eNB may inform the UE of a subframe set to be measured (simply referred to as a restriction subset) via a higher layer (e.g., RRC) signal. Measurement for radio link management (RLM)/radio resource management (RRM) is changed according to subframe type so as to prevent unnecessary radio link failure (RLF) and to acquire an accurate measurement result of reference signal received quality (RSRQ)/reference signal received power (RSRP).

Accordingly, if the serving cell participates in ABS-based interference coordination, the UE may appropriately perform measurement with respect to the serving cell. However, if the UE is handed over to a cell which participates in ABS-based interference coordination, a problem may occur when performing measurement with respect to the target cell. This is because the UE should complete handover to the cell in order to receive RRC signaling for the restriction subset.

As a method of solving the above-described problem, in the present embodiment, if the UE is handed over to the cell which participates in ABS-based interference coordination, the serving cell transmits subframe allocation information of the target cell to the UE in a handover process. Here, the subframe allocation information may include information indicating a measurement restriction set, that is, a subframe pattern (or set) related to channel measurement. For example, the subframe allocation information may be used to indicate the measurement restriction set for CSI measurement and/or a subframe pattern (or set) for RLM/RRM. The measurement restriction set may mean a subframe pattern (or set) in which channel measurement is allowed or a subframe pattern (or set) in which channel measurement is prohibited. The measurement restriction set may be repeated within one or more radio frames. According to implementations, the subframe allocation information may include information indicating a plurality of measurement restriction sets. Each measurement restriction set may mean a separate subframe pattern (or set) in which channel measurement is allowed. The subframe allocation information may be indicated using a bitmap and each bit may indicate whether channel measurement of the subframe is allowed. The subframe allocation information may be transmitted via a higher layer (e.g., RRC) signal. The subframe allocation information may be included in a handover command message.

Figure 14:
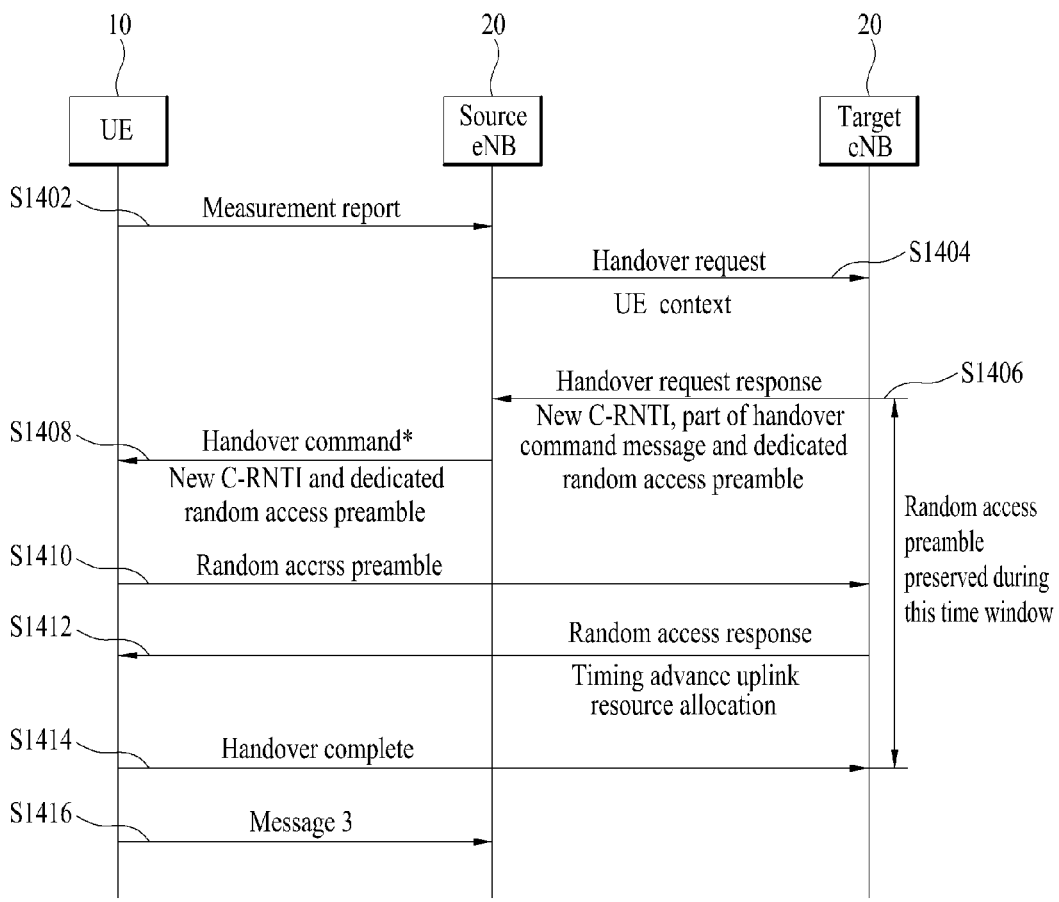
FIG. 14 is a diagram showing a method of measuring a target cell according to an embodiment of the present invention.

FIG. 14 is a diagram showing a method of measuring a target cell according to an embodiment of the present invention. The basic process is equal to that described with reference to FIG. 12, and, for a detailed description thereof, refer to FIG. 12. Unlike FIG. 12, a handover command message further includes subframe allocation information indicating a measurement set (S1408). Although not shown, the UE may receive a signal from the target eNB in a time interval corresponding to the measurement restriction set and measure the target eNB using the signal. The measurement result (e.g., RSRP CSI, etc.) may be reported to the target eNB periodically or aperiodically. Information about the measurement restriction information received in S1408 may be effectively used until information about an updated measurement restriction set is received. Information about the updated measurement restriction set may be provided via system information or UE-dedicated RRC signaling.

As another method, in order to reduce signaling overhead related to the measurement restriction set, a method of utilizing a measurement restriction set used upon measurement of a neighbor cell at a UE in a handover process or in communication with a target cell may be considered. More specifically, the UE measures the signal (e.g., RSRP or RSRQ) of the neighbor cell in order to determine whether handover is performed, and the neighbor cell participates in ABS-based interference coordination. In this case, the serving cell informs the UE of the measurement restriction set used upon measurement of the neighbor cell so as to control a measurement interval for the neighbor cell. Thereafter, in a handover process, if the target cell indicated by the handover command (see S1408 of FIG. 14) is a neighbor cell which performs measurement using the measurement restriction set transmitted by the serving cell, the UE may use the same measurement restriction set for the handover process or RLM, RRM and/or CSI measurement for the cell.

According to the present embodiment, the UE may appropriately perform measurement with respect to the target cell upon handover. For example, in the handover process, if a CSI report request is included in a random access response message (see S1412 of FIG. 14), the UE may report the CSI of the measurement restriction set including CSI reference resources (e.g., CSI-RS) according to existing operation. The measurement restriction set may be indicated by subframe allocation information in the handover command (see S1408 of FIG. 14) or may be previously used for neighbor cell (current target cell) measurement, as described above. In addition, even when the UE measures RSRP/RSRQ or performs RLM with respect to the target cell, the measurement restriction set indicated by the handover command or the measurement restriction set used for neighbor cell (current target cell) measurement may be used.

For the above-described operation, the serving cell and the target cell may exchange necessary information via a backhaul link. For example, the target cell may inform the serving cell of an ABS pattern (e.g., a 40-bit bitmap) related thereto. The serving cell may inform the target cell that a specific UE performs restricted monitoring/measurement during and/or after the handover process. In addition, the serving cell may inform the target cell of subframe allocation information related to restriction monitoring/measurement. Here, the subframe allocation information may be determined based on the ABS pattern but may not correspond to or be equal to the ABS pattern.

If the serving cell and the target cell do not exchange information, the target cell which participates in ABS-based interference coordination may operate using a predetermined modulation and coding (MCS) scheme (e.g., lowest MCS) regardless of the measurement value of the UE during the handover process.

Embodiment 2

Serving Cell Decision

As described with reference to FIG. 13, in a macro-pico scenario, a region of a pico cell is virtually expanded to improve throughput. However, in a process of expanding the region of the pico cell, a pico UE (PUE) in an expansion region (e.g., a CRE region) experiences strong interference from downlink transmission of the macro cell.

Hereinafter, in the present embodiment, a method of deciding a serving cell if the PUE in the expansion region is in the RRC_IDLE state, is changed from the RRC_IDLE state to the RRC_CONNECTED state or is changed from the RRC_CONNECTED state to the RRC_IDLE state is proposed.

As one method, a method of, at the pico cell, instructing handover of the PUE to the macro cell when the PUE belonging to the expansion region (e.g., the CRE region) is changed from the RRC_CONNECTED state to the RRC_IDLE state is proposed. This is because, when the PUE in the expansion region performs measurement, strong signal strength of the macro cell is measured. Accordingly, the present method may be interpreted as forcing handover to a cell for transmitting a signal (or interference) having strength stronger than signal strength of the serving cell. According to the present method, it is not necessary to consider additional signaling and operation such as cell re-selection bias in the RRC_IDLE state. In contrast, if the UE is changed from the RRC_IDLE state to the RRC_CONNECTED state, the macro cell may signal handover to the pico cell to the UE in consideration of load distribution, throughput, etc. if the UE operates in the expansion region.

In the method of specifying the macro cell as the serving cell, handover or cell reselection should be performed whenever change between the RRC_IDLE state and the RRC_CONNECTED state occurs and problems such as latency, signaling overhead, etc. may occur. Accordingly, as another method, a method of, at the PUE in the expansion region, recognizing the pico cell as the serving cell under a predetermined condition even if the signal strength of the pico cell measured in the RRC_IDLE state is less than the signal strength of the macro cell (that is, even if the existing cell re-selection condition is satisfied) is proposed.

A method of specifying a cell-specific measurement offset (or cell re-selection bias) with respect to peripheral cells of the UE via UE-dedicated signaling (or broadcast signaling) is proposed. Here, the cell-specific measurement offset may be defined as a value added when measuring the signal strength or quality (RSRP, RSRQ, etc.) of each cell. For example, the pico eNB may signal, to the UE in the CRE region, a predetermined value (e.g., an offset) added to the signal strength of the pico cell upon measurement in the RRC_IDLE state. In this case, if the signal of the macro cell is greater than the signal of the pico cell but a difference therebetween is less than a predetermined value, cell re-selection to the macro eNB may be prevented and the pico cell may be recognized as the serving cell. If the signal strength of the neighbor cell satisfies the cell re-selection condition even when considering the offset, cell re-selection due to movement of the UE may be recognized and the neighbor cell may be selected. Using a similar method, a method of maintaining the pico cell as the serving cell before RSRP, PSRQ, etc. of the pico cell signal becomes less than a specific value or maintaining the pico cell as the serving cell until RSRP, RSRQ, etc. of the neighbor cell (e.g., macro cell) signal becomes greater than a specific value may be considered.

As another example of maintaining the pico cell as the serving cell, the PUE may perform measurement in a subframe other than a paging time in the RRC_IDLE state. In this case, a subframe set in which measurement is performed may be composed of a subset of a subframe set, which is set to an ABS of the macro cell. Through the present method, the PUE in the RRC_IDLE state may measure a subframe with low interference from the macro cell and maintain the pico cell as the serving cell. As another method, a method of setting a subframe corresponding to a paging time of a pico cell to an ABS in a macro cell or a method of assuming that paging is received in a subframe set as an ABS in the macro cell is possible. In the former case, the pico cell may provide the macro cell with information about a paging time of the UE (e.g., period or offset). In the latter case, the pico cell may set the paging time of the UE using ABS pattern information received from the macro cell and signal the paging time to the UE via RRC signaling, etc.

If the RRC_IDLE state becomes longer, the UE is preferably included in the macro cell rather than the pico cell. Accordingly, if the PUE in the expansion region is changed to the RRC_IDLE state, the pico cell may be maintained as the serving cell for a predetermined time and then cell re-selection may be performed based on the signal strength received from each cell. In one implementation, if the PUE in the expansion region is switched to the RRC_IDLE state, a timer may operate. Thereafter, the PUE may maintain the pico cell as the serving cell until the timer expires and may perform cell re-selection based on the signal strength received from each cell after the timer has expired. In this case, in order to assign priority to cell re-selection to the neighbor cell, the PUE may not apply an offset for assigning priority to the pico cell in the cell re-selection process. If the normal PUE is changed to the RRC_IDLE state, the above-described timer does not operate and an offset for giving priority to the pico cell is applied in the cell re-selection process.

Embodiment 3

Cell Measurement

In the present embodiment, a method of measuring a cell when a UE is in the RRC_IDL state or is changed from an RRC_IDL state to an RRC_CONNECTED state in a state in which interference coordination is performed is proposed. Here, the cell includes a serving cell or a target cell.

The PUE in the expansion region should receive (UE-dedicated) RRC signaling indicating a measurement restriction set in the RRC_CONNECTED state in order to perform measurement restriction set-based measurement. Accordingly, even when the PUE is in the RRC_IDLE state or is changed to the RRC_CONNECTED state, the PUE may not perform measurement restriction set-based measurement before receiving the (UE-dedicated) RRC signaling. Accordingly, if the (UE-dedicated) RRC signaling is signaled later or is not decoded, the UE performs incorrect measurement and, in a worst case, may cause radio link failure, etc.

In the present embodiment, a method of solving the above-described problems is proposed. First, a method of signaling a temporary measurement restriction set to a UE is proposed. Information about the temporary measurement restriction set may be received in a previous RRC_CONNECTED state or in an RRC_IDLE state via broadcast information (e.g., system information (SI), etc.) (see S301 and S302 of FIG. 3). Accordingly, the UE may perform measurement restriction set-based measurement using the temporary measurement restriction set in the RRC_IDLE state. In addition, even when the UE is changed from the RRC_IDLE state to the RRC_CONNECTED state, the UE may perform measurement restriction set-based measurement in the RRC_CONNECTED state using the temporary measurement restriction set until receiving an updated measurement restriction set from an eNB. That is, the UE may differently performs measurement for RLM/RRM using the temporary measurement restriction set even before receiving UE-dedicated RRC signaling indicating the measurement restriction set so as to prevent unnecessary RLF and to acquire an accurate RSRQ/RSRP and CSI measurement result.

Here, the temporary measurement restriction set may be predetermined via inter-cell coordination. For example, in a macro-pico case, the macro cell may continuously signal a subframe set (simply referred to as an ABS set) to be set as an ABS to a pico eNB and the pico cell may determine a temporary measurement restriction set based on the ABS set. The ABS set and the temporary measurement restriction set may not be equal and may be independently defined. Preferably, the temporary measurement restriction set may be defined as a subset of an ABS set.

As another method, a temporary measurement restriction set may be pre-fixed between an eNB and a UE. In this case, signaling for a temporary measurement restriction set is unnecessary. The pre-fixed temporary measurement restriction set may be defined as a subframe (e.g., subframe #0/#5 of every radio frame) in which a downlink synchronization signal (e.g., a P-SCH or an S-SCH) is transmitted. As another example, the pre-fixed temporary measurement restriction set may be defined as a subframe (e.g., subframe #0 of every radio frame) in which a PBCH is transmitted. As another example, the pre-fixed temporary measurement restriction set may be defined as a subframe set for paging (see FIG. 5). In addition, the pre-fixed temporary measurement restriction set may be defined as a combination of a subframe in which a downlink synchronization signal is transmitted, a subframe in which a PBCH is transmitted, and a subframe set for paging.

Embodiment 4

Aggressor-Assisted Paging

In a UE in a CRE region of a pico cell, demodulation performance of a paging channel, a system information channel, etc. may be significantly reduced due to interference from a macro cell. Accordingly, in the present embodiment, a PUE receives a signal such as paging, system information or an RACH response from the macro cell while maintaining the pico cell as a serving cell in the CRE region. In particular, in case of paging, since the location of the UE to be paged cannot be accurately confirmed, a plurality of cells belonging to a region, in which the UE is estimated to be located, transmits a paging message. Accordingly, the UE does not need to receive a paging message from a serving cell thereof and may receive a paging message from a neighbor cell. According to the present embodiment, the pico cell and the macro cell may exchange information such as system information of each cell, a cell ID, and a UE ID of the UE via X2 signaling such that the macro cell transmits a signal such as paging, system information or RACH response to the PUE.

More specifically, operation performed by the PUE in an expansion region may use the following methods. Here, the PUE may be in the RRC_CONNECTED state or the RRC_IDLE state. The PUE is preferably in the RRC_IDLE state.

Method 1: the PUE in the expansion region may receive paging from the macro cell. In this case, system information and RACH response may be received as follows.

A. System information (e.g., MIB, SIB, etc.) may be received from the macro cell. The macro cell and the pico cell may exchange information necessary for paging. For example, the pico cell eNB may inform the macro cell eNB of information about system information change (e.g., information change, changed system information, etc.). Alternatively, the macro cell may inform the pico cell of necessary information (e.g. system information, paging information, etc.) and the pico cell may inform the PUE of system information of the macro cell and paging related information. Through information exchange between the macro cell and the pico cell, the macro cell may inform the PUE in the expansion region that the system information of the pico cell has been changed, through paging. The PUE may recognize that the system information of the pico cell has been changed through paging, receive the changed system information of the pico cell from the macro cell, and perform a system information re-configuration procedure.

B. The system information (e.g., MIB, SIB, etc.) may be received from the pico cell. In this case, the macro cell informs the UE of only paging information and receives the changed system information from the pico cell. Accordingly, signaling through a separate X2 interface is not required. Alternatively, the pico cell may transmit, to the macro cell, only 1-bit information indicating whether system information is changed via an X2 interface.

C. The PUE in the expansion region may be changed to the RRC_CONNECTED state and may transmit a signal to the pico cell when the RACH process is performed.

Figure 15:
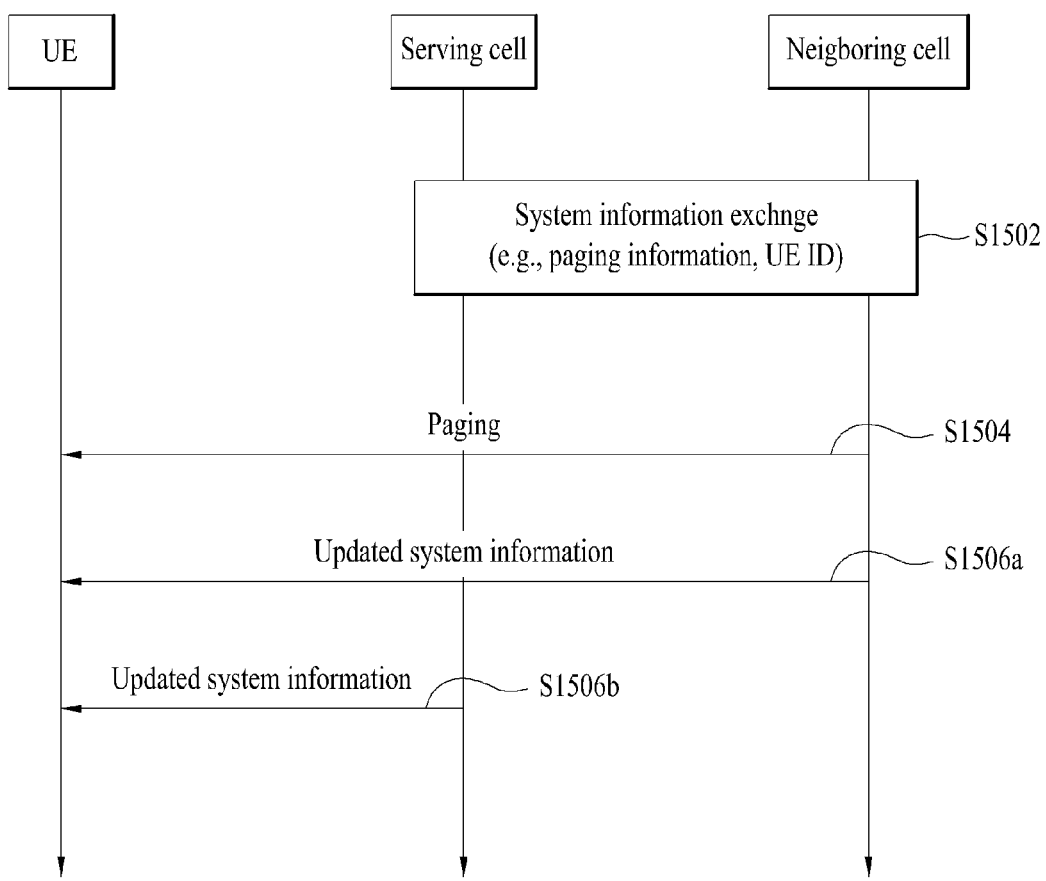
FIG. 15 is a diagram showing a paging process according to an embodiment of the present invention.

FIG. 15 shows a signal transmission/reception method of Method 1. In the present example, a serving cell may correspond to a pico cell and a neighbor cell may correspond to a macro cell. In addition, a UE may correspond to a UE (e.g., PUE) in an expansion region.

Referring to FIG. 15, the serving cell and the neighbor cell exchange system information (S1502). The system information may include information about system information change (e.g., information change, changed system information, etc.), system information, paging information, etc., for example. According to implementations and exchange information, the system information may be transmitted from the serving cell to the neighbor cell or from the neighbor cell to the serving cell. Thereafter, the UE in the expansion region monitors a paging subframe set by the neighbor cell in order to receive paging (S1504). For example, paging may be used to inform the UE that the system information has been changed in the serving cell. In this case, the updated system information of the serving cell may be received from the neighbor cell (S1506a) or from the serving cell (S1506b).

Method 2: The PUE in the expansion region may receive paging and RACH response from the macro cell. Here, the PUE may be in the RRC_CONNECTED state or the RRC_IDLE state. Preferably, the PUE is in the RRC_IDLE state.

A. The PUE may receives, from the macro cell, a response to an RACH preamble transmitted to the pico cell. That is, the RACH preamble is transmitted to the pico cell and the RACH response thereto may be received from the macro cell. That is, in the present method, the paging and RACH response is received from the macro cell having a good signal state while the pico cell is maintained as the serving cell. If the RACH preamble is received from the PUE, the pico cell may exchange information about the RACH response with the macro cell.

B. In the present method, similarly to Method 1, the PUE receives the paging and RACH response from the macro cell having a good signal state while the pico cell is maintained as the serving cell.

Figure 16:
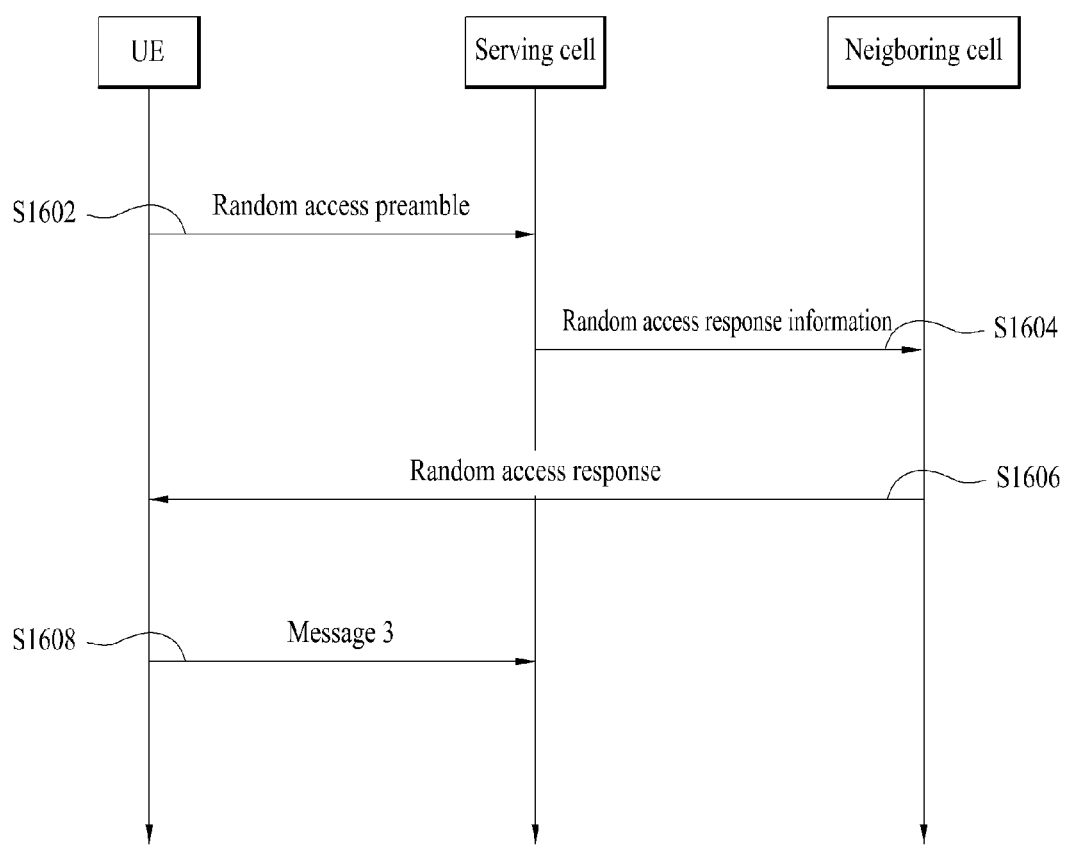
FIG. 16 is a diagram showing an RACH process according to an embodiment of the present invention.

FIG. 16 shows a signal transmission/reception method of Method 2. In the present example, a serving cell may correspond to a pico cell and a neighbor cell may correspond to a macro cell. In addition, a UE may correspond to a UE (e.g., PUE) in an expansion region.

Referring to FIG. 16, the UE transmits a random access preamble to the serving cell (S1602). In this case, the serving cell transmits random access response information (e.g., a preamble sequence, etc.) to the target cell (S1604). Thereafter, the neighbor cell transmits the random access response information to the UE (S1606). The UE transmits the random access preamble and then monitors a window for the random access response. In this case, the UE may omit operation for receiving the random access response (e.g., PDCCH reception/decoding or PDSCH reception/decoding) at a specific time interval within the window. The specific time interval includes a subframe set as an ABS. If the random access response is received, the UE transmits Message 3 (e.g., UL-SCH transport block) to the serving cell using scheduling information in the random access response (S1608). The present example corresponds to a contention-free based RACH. In case of a contention based RACH, a contention resolution message may be received from the serving cell and/or the neighbor cell (not shown) after transmitting Message 3.

In the present specification, the PUE in the expansion region is used for convenience and the PUE of the present invention is not identified according to geographical location. For example, the PUE in the expansion region is located at a cell edge in terms of signal transmission/reception based on the strength or quality (e.g., RSRP, RSRP, etc.) of the signal measured by the PUE, rather than the actual geographical location of the PUE. In order to apply the embodiments of the present invention to only the PUE in the expansion region, the pico cell may transmit, to the PUE, information indicating whether the present invention is applied (e.g., 1-bit information) through higher layer signaling (e.g., RRC signaling or MAC signaling) or physical layer signaling (e.g., PDCCH). For example, if the 1-bit information is set to a specific value, the UE may perform UE operation in the expansion region described in Embodiments 1 to 4. If the 1-bit information is set to another value, the UE may perform normal UE operation.

Figure 17:
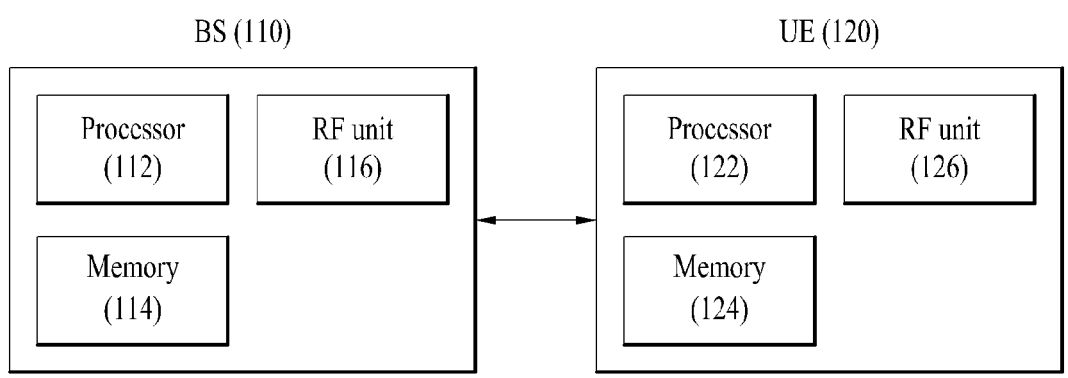
FIG. 17 is a diagram showing a base station and a UE to which the present invention is applicable.

FIG. 17 shows a base station and a UE to which one embodiment of the present invention is applicable. If a relay is included in a wireless communication system, communication between the eNB and the relay is performed in a backhaul link and communication between the relay and the UE is performed in an access link. Accordingly, the eNB or UE shown in FIG. 17 may be replaced with the relay.

Referring to FIG. 17, the wireless communication system includes a base station (BS) 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 to store a variety of information related to operation of the processor 112. The RF unit 116 is connected to the processor 112 to transmit and/or receive a RF signal. The UE 120 includes a processor 122, a memory 124 and a radio frequency (RF) unit 126. The processor 122 may be configured to implement the procedures and/or methods proposed by the present invention. The memory 124 is connected to the processor 122 to store a variety of information related to operation of the processor 122. The RF unit 126 is connected to the processor 122 to transmit and/or receive an RF signal. The BS 110 and/or the UE 120 may have a single antenna or multiple antennas.

The above-described embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a user equipment, a relay node and a base station. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary. The term "terminal" may also be replaced with the term User Equipment (UE), subscriber station (SS) or mobile subscriber station (MSS) as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. Software code may be stored in a memory unit so as to be executed by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention may be used for a wireless communication device such as a terminal or a base station.

The invention claimed is:

1. A method of performing a channel measurement at a User Equipment (UE) in a wireless communication system, the method comprising:
    receiving a handover command message including subframe allocation information of a target cell indicating a measurement restriction set related to a channel measurement from a serving cell via a physical layer,
    wherein the target cell is interfered with by a neighbor cell and participates in almost blank subframe (ABS)-based interference coordination,
    wherein the measurement restriction set indicates a subframe pattern in which channel measurement is allowed based on the ABS-based interference coordination, and
    wherein the UE is not able to receive, from the target cell via higher layer signaling, the subframe allocation information of the target cell before the UE handover to the target cell is completed,
    receiving a signal from the target cell in a time interval corresponding to the measurement restriction set,
    measuring a channel of the target cell using the received signal, and
    determining whether to perform handover to the target cell based on the measurement of the target cell.

2. The method according to claim 1, wherein the signal of the target cell is received using the subframe allocation information in the handover command message until updated subframe allocation information is received.

3. The method according to claim 2, wherein the updated subframe allocation information is received via system information or signaling dedicated to the UE.

4. A user equipment (UE) used in a wireless communication system, the UE comprising:
    a radio frequency (RF) unit; and
    a processor that:
    controls the RF unit to receive, via a physical layer, a handover command message including subframe allocation information of a target cell indicating a measurement restriction set related to a channel measurement,
    wherein the target cell is interfered with by a neighbor cell and participates in almost blank subframe (ABS)-based interference coordination,
    wherein the measurement restriction set indicates a subframe pattern in which a channel measurement is allowed based on the ABS-based interference coordination, and
    wherein the UE is not able to receive, from the target cell via higher layer signaling, the subframe allocation information of the target cell before the UE handover to the target cell is completed,
    controls the RF unit to receive a signal from the target cell in a time interval corresponding to the measurement restriction set,
    measures a channel of the target cell using the signal, and
    determines whether to perform handover to the target cell based on a measurement of the target cell.

5. The UE according to claim 4, wherein the signal of the target cell is received using the subframe allocation information in the handover command message until updated subframe allocation information is received.

6. The UE according to claim 5, wherein the updated subframe allocation information is received via system information or signaling dedicated to the UE.

* * * * *